US012625824B2

(12) United States Patent
Su et al.

(10) Patent No.: US 12,625,824 B2
(45) Date of Patent: May 12, 2026

(54) COMPUTER SYSTEM AND MODE SWITCHING METHOD THEREOF

(71) Applicant: ASMedia Technology Inc., New Taipei City (TW)

(72) Inventors: Chunyuan Su, New Taipei City (TW); Ming-Han Hsu, New Taipei City (TW)

(73) Assignee: ASMedia Technology Inc., New Taipei City (TW)

( * ) Notice: Subject to any disclaimer, the term of this patent is extended or adjusted under 35 U.S.C. 154(b) by 3 days.

(21) Appl. No.: 18/786,554

(22) Filed: Jul. 28, 2024

(65) Prior Publication Data

US 2026/0017211 A1     Jan. 15, 2026

(30) Foreign Application Priority Data

Jul. 10, 2024     (TW) ................................. 113125832

(51) Int. Cl.
G06F 13/10            (2006.01)
(52) U.S. Cl.
CPC .................................. G06F 13/102 (2013.01)
(58) Field of Classification Search
CPC .................................................... G06F 13/102
USPC ................................ 710/2, 8, 14, 15, 18, 62
See application file for complete search history.

(56) References Cited

U.S. PATENT DOCUMENTS 5,471,625 A  *  11/1995  Mussemann .......... G06F 1/3203
                                                                           713/323
2009/0070615 A1 *  3/2009  Maggiolino ............ H04L 12/10
                                                                           713/340

2021/0042059 A1     2/2021  Colenbrander
2021/0065772 A1 *  3/2021  Suh .......................... G06F 1/324
2021/0173756 A1 *  6/2021  Yoon ..................... G06F 13/423

FOREIGN PATENT DOCUMENTS

| CA | 2460276 C | * 5/2011 | ............. G06F 13/10 |
| CN | 113986800 | 1/2022 | |
| TW | 202240413 | 10/2022 | |
| TW | I831654 | 2/2024 | |

OTHER PUBLICATIONS

"Office Action of Taiwan Counterpart Application", issued on Mar. 4, 2025, p. 1-p. 6.

* cited by examiner

*Primary Examiner* — Henry W Yu
(74) *Attorney, Agent, or Firm* — JCIPRNET

(57)            ABSTRACT

A computer system and a mode switching method thereof are provided. The computer system includes a processor, a plurality of peripheral components, and a switch. The switch is coupled to the processor via a first transmission interface link and respectively coupled to the plurality of peripheral components via second transmission interface links. The switch includes a first flag register and a second flag register. When a first target peripheral component in the peripheral components is to be entered into a low power consumption mode, the processor sets a low power consumption flag bit corresponding to the first target peripheral component in the first flag register. When a second target peripheral component in the low power consumption mode in the peripheral components transmits a wake-up signal to the switch, the switch sets a wake-up flag bit corresponding to the second target peripheral component in the second flag register.

18 Claims, 4 Drawing Sheets

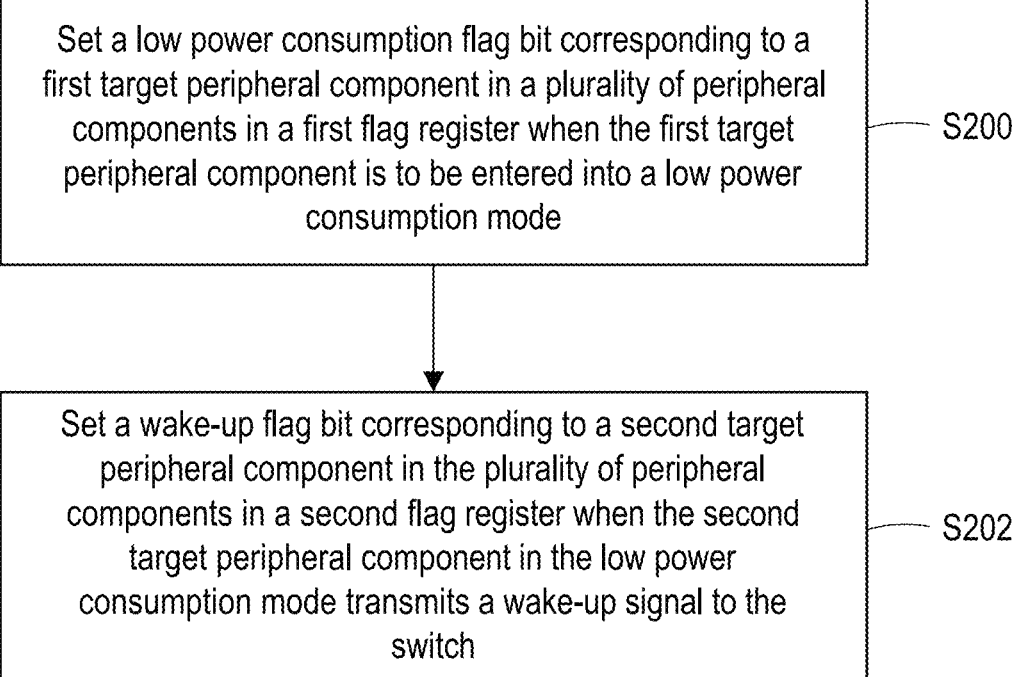

Set a low power consumption flag bit corresponding to a first target peripheral component in a plurality of peripheral components in a first flag register when the first target peripheral component is to be entered into a low power consumption mode ⟶ S200

Set a wake-up flag bit corresponding to a second target peripheral component in the plurality of peripheral components in a second flag register when the second target peripheral component in the low power consumption mode transmits a wake-up signal to the switch ⟶ S202

FIG. 2

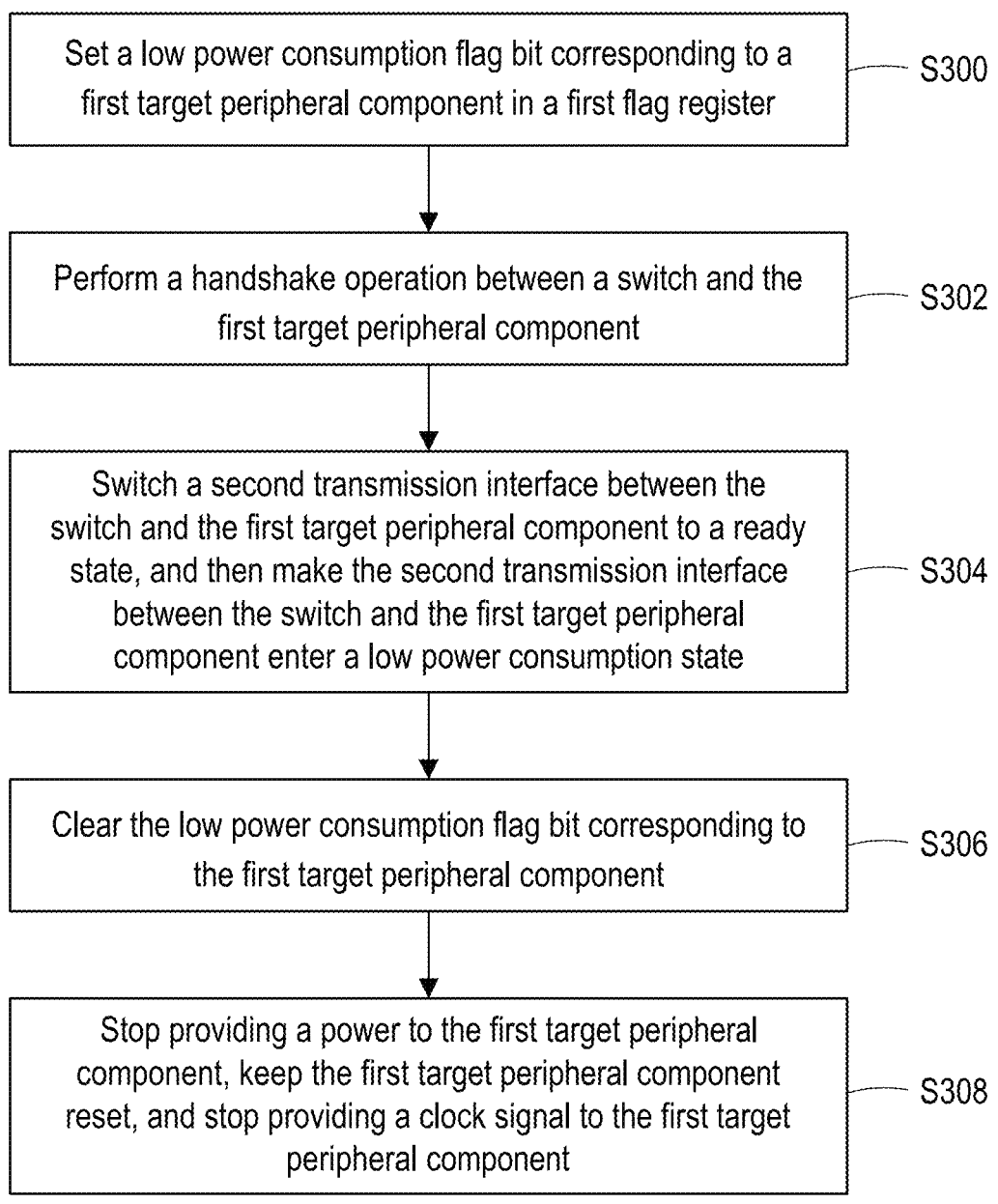

Set a low power consumption flag bit corresponding to a first target peripheral component in a first flag register — S300

Perform a handshake operation between a switch and the first target peripheral component — S302

Switch a second transmission interface between the switch and the first target peripheral component to a ready state, and then make the second transmission interface between the switch and the first target peripheral component enter a low power consumption state — S304

Clear the low power consumption flag bit corresponding to the first target peripheral component — S306

Stop providing a power to the first target peripheral component, keep the first target peripheral component reset, and stop providing a clock signal to the first target peripheral component — S308

FIG. 3

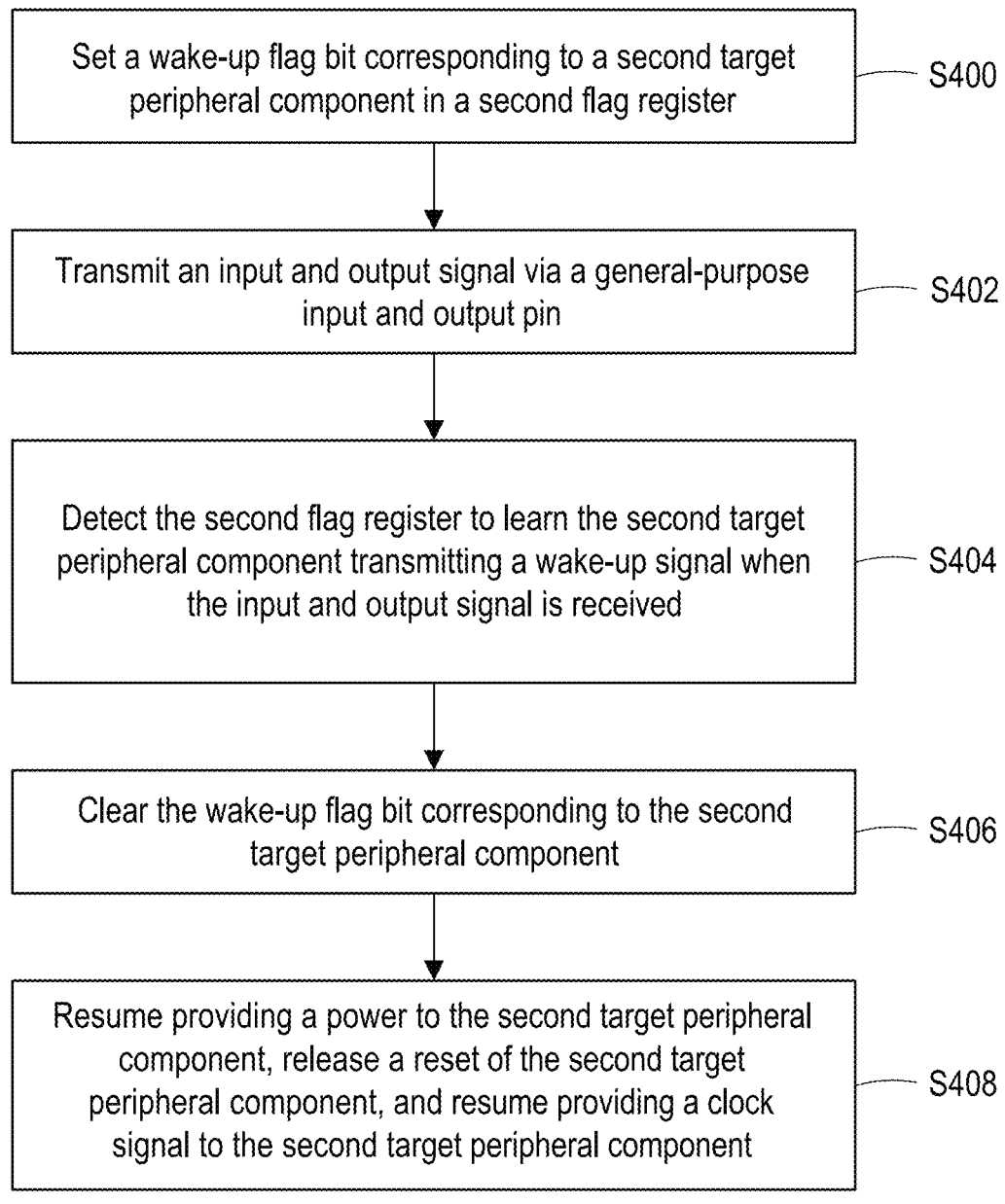

| Set a wake-up flag bit corresponding to a second target peripheral component in a second flag register | — S400 |

↓

| Transmit an input and output signal via a general-purpose input and output pin | — S402 |

↓

| Detect the second flag register to learn the second target peripheral component transmitting a wake-up signal when the input and output signal is received | — S404 |

↓

| Clear the wake-up flag bit corresponding to the second target peripheral component | — S406 |

↓

| Resume providing a power to the second target peripheral component, release a reset of the second target peripheral component, and resume providing a clock signal to the second target peripheral component | — S408 |

FIG. 4

COMPUTER SYSTEM AND MODE SWITCHING METHOD THEREOF

CROSS-REFERENCE TO RELATED APPLICATION

This application claims the priority benefit of Taiwan application serial no. 113125832, filed on Jul. 10, 2024. The entirety of the above-mentioned patent application is hereby incorporated by reference herein and made a part of this specification.

BACKGROUND OF THE INVENTION

Field of the Invention

The invention relates to a computer system, and in particular, to a computer system capable of entering a low power consumption mode and a mode switching method adopted thereby.

Description of Related Art

The Peripheral Component Interconnect Express (PCIe) bus is an industry-standard computer expansion technique developed by the PCI Special Interest Group (PCI-SIG). According to the standards currently published by PCI-SIG, peripheral components or devices under the PCIe switch may not individually enter low power consumption mode (for example, the D3 mode specified by Advanced Configuration and Power Interface (ACPI)). Therefore, it is currently only possible to achieve the situation in which all peripheral components or devices under the PCIe switch enter the low power consumption mode at the same time. In addition, once one of the peripheral components or devices is to return to the operating mode (for example, the D0 mode specified by ACPI), all peripheral components or devices under the PCIe switch also need to return to the D0 mode. This behavior of entering and exiting at the same time may not achieve effective power saving, thus resulting in poor power saving effect and causing the issue of excessive power consumption.

SUMMARY OF THE INVENTION

The invention provides a computer system and a mode switching method thereof that may allow peripheral components under a PCIe switch to individually enter a low power consumption mode.

A computer system of the invention includes a processor, a plurality of peripheral components, and a switch. The switch is coupled to the processor via a first transmission interface link and respectively coupled to the plurality of peripheral components via second transmission interface links. The switch includes a first flag register and a second flag register. When a first target peripheral component in the peripheral components is to be entered into a low power consumption mode, the processor sets a low power consumption flag bit corresponding to the first target peripheral component in the first flag register. When a second target peripheral component in the low power consumption mode in the peripheral components transmits a wake-up signal to the switch, the switch sets a wake-up flag bit corresponding to the second target peripheral component in the second flag register.

A mode switching method of the invention is suitable for a computer system including a plurality of peripheral components and a switch. The switch is respectively coupled to the plurality of peripheral components via a plurality of transmission interface connection links, and includes a first flag register and a second flag register. The mode switching method includes the following steps: setting a low power consumption flag bit corresponding to a first target peripheral component in the peripheral components in the first flag register when the first target peripheral component is to be entered into a low power consumption mode; and setting a wake-up flag bit corresponding to a second target peripheral component in the peripheral components in the second flag register when the second target peripheral component in the low power consumption mode transmits a wake-up signal to the switch.

Based on the above, the computer system and the mode switching method thereof of the invention may allow peripheral components under the switch to individually enter the low power consumption mode by setting a specially configured flag register. In this way, the power saving mechanism may be made more flexible, power saving efficiency may be improved, and therefore the issue of excessive power consumption may be solved.

In order to make the aforementioned features and advantages of the present application more comprehensible, embodiments accompanied with figures are described in detail below.

BRIEF DESCRIPTION OF THE DRAWINGS

FIG. 2 is a flowchart of a mode switching method shown according to an embodiment of the invention.

FIG. 3 is a flowchart of a mode switching method shown according to an embodiment of the invention.

FIG. 4 is a flowchart of a mode switching method shown according to an embodiment of the invention.

DESCRIPTION OF THE EMBODIMENTS

Figure 1:
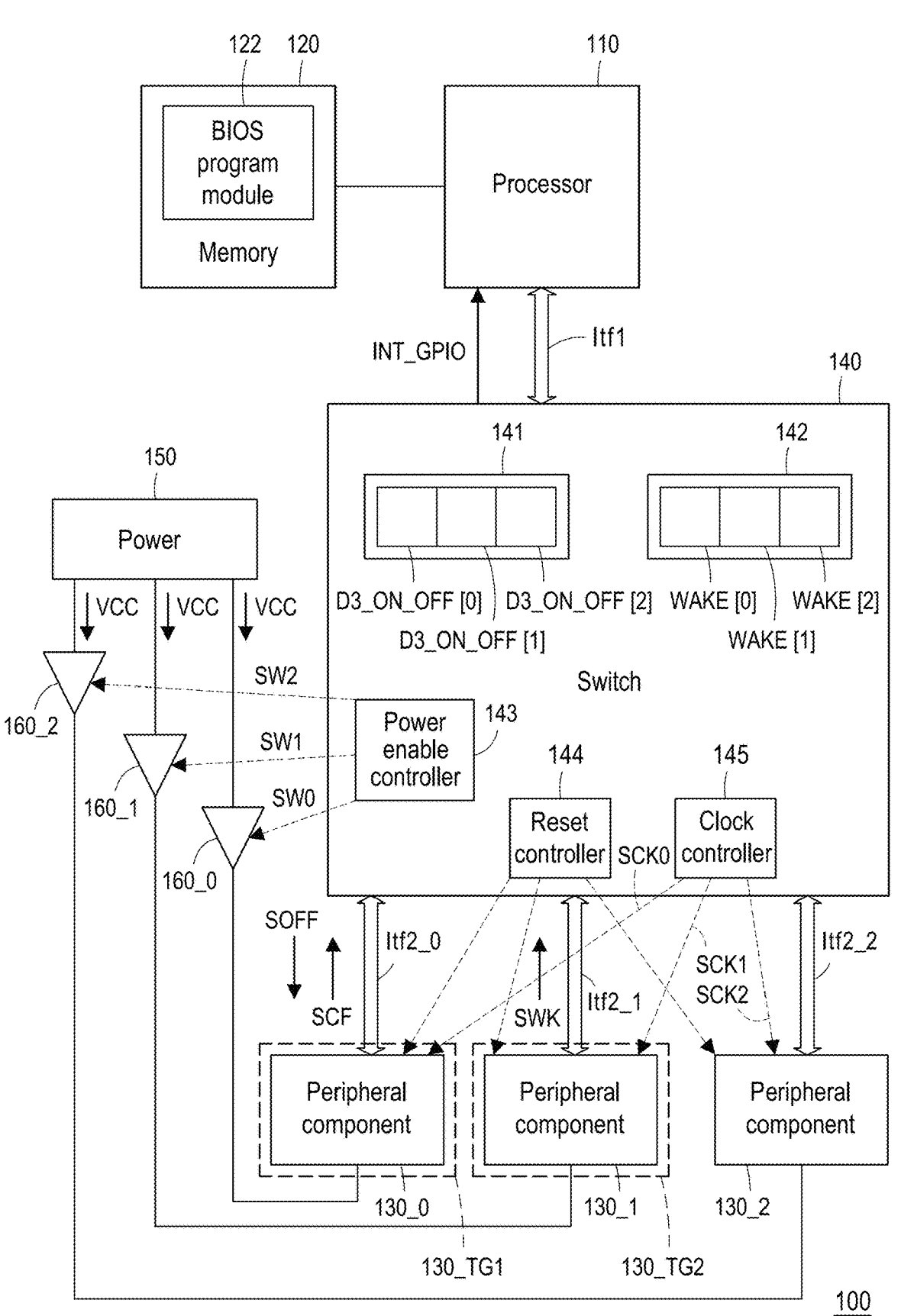
FIG. 1 is a schematic block diagram of a computer system shown according to an embodiment of the invention.

Please refer to FIG. 1. A computer system 100 of the present embodiment is, for example, a computer device such as a desktop computer, a notebook computer, or a server. The invention does not limit the type thereof. The computer system 100 includes a processor 110, a memory 120, peripheral components 130_0 to 130_2, and a switch 140.

The processor 110 is, for example, a central processing unit (CPU) or a programmable microprocessor, a digital signal processor (DSP), a programmable controller, an application-specific integrated circuit (ASIC), or other similar components or a combination of the above components for general use or special use.

The memory 120 is, for example, a non-volatile memory such as a read-only memory (ROM), an electrically-erasable programmable read-only memory (EEPROM), or a flash ROM. The memory 120 is coupled to the processor 110 and stores a basic input and output system (BIOS) program module 122. The basic input and output system program module 122 is, for example, a program module of a Unified Extensible Firmware Interface (UEFI) BIOS. In the present embodiment, the processor 110 may load the basic input and output system program module 122 to perform power management related to the ACPI standard.

The peripheral components 130_0 to 130_2 are, for example, network devices, input and output devices, memory devices, etc. supporting the PCIe bus protocol. For ease of understanding, three peripheral components 130_0 to 130_2 are used in the present implementation for explanation, but the invention is not limited thereto. Those skilled in the art may extrapolate the number of peripheral components in the computer system 100 to less or more depending on their actual needs and by referring to the teachings of the present embodiment.

The switch 140 is, for example, a PCIe switch. The switch 140 is coupled to the processor 110 via a first transmission interface link Itf1 and respectively coupled to the peripheral components 130_0 to 130_2 via second transmission interface links Itf2_0 to Itf2_2. The first transmission interface link Itf1 and the second transmission interface links Itf2_0 to Itf2_2 are implemented by PCIe links, for example. In the present embodiment, the switch 140 includes a first flag register 141 and a second flag register 142. The first flag register 141 includes low power consumption flag bits D3_ON_OFF[0] to D3_ON_OFF[2]. The low power consumption flag bits D3_ON_OFF[0] to D3_ON_OFF[2] respectively correspond to the peripheral components 130_0 to 130_2. The set bits may indicate which peripheral component in the peripheral components 130_0 to 130_2 is to enter a low power consumption mode (e.g., D3 mode). The second flag register 142 includes wake-up flag bits WAKE[0] to WAKE[2]. The wake-up flag bits WAKE[0] to WAKE[2] also correspond to the peripheral components 130_0 to 130_2 respectively. The set bits may indicate which peripheral component in the peripheral components 130_0 to 130_2 is to return to the operating mode (e.g., D0 mode). The number of bits included in the first flag register 141 and the second flag register 142 may depend, for example, on the number of peripheral components coupled to the switch 140.

In addition, the switch 140 further includes a power enable controller 143, a reset controller 144, and a clock controller 145. As shown in FIG. 1, in the computer system 100, a power 150 may be used to provide a power voltage VCC to the peripheral components 130_0 to 130_2, and switching devices 160_0 to 160_2 are disposed on the power supply path. The power enable controller 143 may respectively turn on or off the switching devices 160_0 to 160_2 via switching signals SW0 to SW2, thereby controlling the power supply to the peripheral components 130_0 to 130_2. The reset controller 144 may keep the peripheral devices 130_0 to 130_2 reset without action by setting the reset pins on the peripheral devices 130_0 to 130_2 to a low logic level. The clock controller 145 may be used to provide clock signals SCK0 to SCK2 to the peripheral components 130_0 to 130_2 respectively. The power enable controller 143, the reset controller 144, and the clock controller 145 may be implemented by, for example, a microprocessor or a microcontroller.

The mode switching method of the invention is performed when the processor 110 performs power management. The following embodiments illustrate the detailed steps of the mode switching method of the invention. Please refer to FIG. 1 and FIG. 2 at the same time. The mode switching method of the present embodiment may be applied to the computer system 100 of FIG. 1. The steps thereof are described as follows:

In step S200, when a first target peripheral component 130_TG1 (the peripheral component 130_0) in the peripheral components 130_0 to 130_2 is to be entered into the low power consumption mode, the processor 110 sets the low power consumption flag bit D3_ON_OFF[0] corresponding to the first target peripheral component 130_TG1 in the first flag register 141. For example, when the first target peripheral component 130_TG1 (the peripheral component 130_0) is idle, the processor 110 may set the low power consumption flag bit D3_ON_OFF[0] to logic 1. When the switch 140 finds that the low power consumption flag bit D3_ON_OFF[0] in the first flag register 141 is set to logic 1, the low power consumption procedure for the first target peripheral component 130_TG1 (the peripheral component 130_0) may be started to be executed to individually enter the first target peripheral component 130_TG1 into the low power consumption mode (e.g., D3 mode).

In step S202, when a second target peripheral component 130_TG2 (the peripheral component 130_1) in the low power consumption mode in the peripheral components 130_0 to 130_2 transmits a wake-up signal SWK to the switch 140, the switch 140 sets a wake-up flag bit WAKE[1] corresponding to the second target peripheral component 130_TG2 (the peripheral component 130_1) in the second flag register 142. For example, when the switch 140 receives the wake-up signal SWK from the second target peripheral component 130_TG2 (the peripheral component 130_1), the switch 140 may set the wake-up flag bit WAKE[1] to logic 1, and an input and output signal INT_GPIO is transmitted to the processor 110 via a general-purpose input and output (GPIO) pin to notify the processor 110 to read the second flag register 142. When the processor 110 finds that the wake-up flag bit WAKE[1] in the second flag register 142 is set to logic 1, the wake-up procedure for the second target peripheral device 130_TG2 (the peripheral component 130_1) may be started to be executed to individually return the second target peripheral component 130_TG2 to the operating mode (e.g., D0 mode).

Via the method above, the switch 140 may learn about the first target peripheral component 130_TG1 to be entered into the low power consumption mode via the first flag register 141, so that the first target peripheral component 130_TG1 may enter the low power consumption mode individually without affecting the normal operation of other peripheral components connected under the switch 140. In addition, the processor 110 may also learn about the woken-up second target peripheral component 130_TG2 via the second flag register 142 without using a total PE_WAKE signal at the upstream end of the switch 140, so that the second target peripheral components 130_TG2 may individually return to the operating mode without affecting the normal sleep of other peripheral components connected under the switch 140. In this way, the power saving mechanism may be made more flexible to achieve effective power saving, improve power saving efficiency, and thereby solve the issue of excessive power consumption.

It should be noted that the first target peripheral component 130_TG1 is, for example, a peripheral component in an idle state, and the second target peripheral component 130_TG2 is, for example, a peripheral component awakened in the low power consumption mode. For ease of understanding, in the present embodiment, the peripheral component 130_0 is assumed to be the first target peripheral component 130_TG1 and the peripheral component 130_1 is assumed to be the second target peripheral component 130_TG2, but the invention is not limited thereto. In other embodiments, the first target peripheral component 130_TG1 and the second target peripheral component 130_TG2 may also be the same peripheral component.

The manner in which the first target peripheral component 130_TG1 enters the low power consumption mode is described in more detail below with reference to an embodiment. Please refer to FIG. 1 and FIG. 3 at the same time. The mode switching method of the present embodiment may be applied to the computer system 100 of FIG. 1. The steps thereof are described as follows:

First, when the first target peripheral component 130_TG1 (the peripheral component 130_0) in the peripheral components 130_0 to 130_2 is to be entered into the low power consumption mode, in step S300, the processor 110 sets the low power consumption flag bit D3_ON_OFF[0] corresponding to the first target peripheral component 130_TG1 in the first flag register 141 to logic 1.

When the switch 140 finds that the low power consumption flag bit D3_ON_OFF[0] in the first flag register 141 is set to logic 1, in step S302, a handshake operation is performed between the switch 140 and the first target peripheral device 130_TG1. Specifically, without the processor 110 (system end), the switch 140 transmits a turn-off signal SOFF (for example, a PME_TURN_OFF signal) to the first target peripheral component 130_TG1 corresponding to the low power consumption flag bit D3_ON_OFF[0], and waits for the first target peripheral component 130_TG1 to return an acknowledge signal SCF (for example, a PME-_TO_ACK signal). At this time, the peripheral components 130_1 and 130_2 other than the first target peripheral component 130_TG1 do not receive the turn-off signal SOFF.

After the handshake operation is completed (the switch 140 receives the acknowledge signal SCF returned by the first target peripheral component 130_TG1 or the switch 140 does not receive the acknowledge signal SCF within a predetermined time), in step S304, the second transmission interface link Itf2_0 between the switch 140 and the first target peripheral component 130_TG1 is switched to a ready state (for example, indicating the L23 ready state specified by the PCIe bus protocol). Then, the processor 110 makes the second transmission interface link Itf2_0 between the switch 140 and the first target peripheral component 130_TG1 enter a low power consumption state (for example, the L23 state specified by the PCIe bus protocol).

Next, in step S306, the switch 140 clears the low power consumption flag bit D3_ON_OFF[0] corresponding to the first target peripheral component 130_TG1 to logic 0.

Lastly, in step S308, the power enable controller 143 turns off the switching device 160_0 via the switching signal SW0 to stop providing power to the first target peripheral component 130_TG1. The reset controller 144 sets the reset pin on the first target peripheral component 130_TG1 to a low logic level, so that the first target peripheral component 130_TG1 is kept reset without action. Furthermore, the clock controller 145 stops providing the clock signal SCK0 to the first target peripheral component 130_TG1. In this way, a low power consumption procedure for a single peripheral component to enter the low power consumption mode may be completed.

The manner in which the second target peripheral component 130_TG2 returns to the operating mode is described in more detail below with reference to an embodiment. Please refer to FIG. 1 and FIG. 4 at the same time. The mode switching method of the present embodiment may be applied to the computer system 100 of FIG. 1. The steps thereof are described as follows:

First, when the second target peripheral component 130_TG2 (the peripheral component 130_1) in the low power consumption mode in the peripheral components 130_0 to 130_2 transmits the wake-up signal SWK to the switch 140, in step S400, the switch 140 sets the wake-up flag bit WAKE[1] corresponding to the second target peripheral component 130_TG2 (the peripheral component 130_1) in the second flag register 142 to logic 1.

Next, in step S402, the switch 140 also transmits the input and output signal INT_GPIO to the processor 110 via the GPIO pin.

When the processor 110 receives the input and output signal INT_GPIO, in step S404, the processor 110 detects the second flag register 142 to learn about the second target peripheral component 130_TG2 transmitting the wake-up signal SWK.

Next, in step S406, the processor 110 clears the wake-up flag bit WAKE[1] corresponding to the second target peripheral component 130_TG2 to logic 0.

Lastly, in step S408, the power enable controller 143 turns on the switching device 160_1 via the switching signal SW1 to resume providing power to the second target peripheral component 130_TG2. The reset controller 144 sets the reset pin on the second target peripheral component 130_TG2 to a high logic level, so that the second target peripheral component 130_TG2 is released from reset. Moreover, the clock controller 145 resumes providing the clock signal SCK1 to the second target peripheral component 130_TG2. Thereby, the second transmission interface link Itf2_1 between the switch 140 and the second target peripheral component 130_TG2 may be restored to complete the wake-up procedure of the single peripheral device returning to the operating mode.

Based on the above, the computer system and the mode switching method thereof of the invention may allow peripheral components under the switch to individually enter the low power consumption mode by setting a specially configured flag register. At the same time, the operation of other peripheral components is not affected. In this way, the power saving mechanism may be made more flexible, power saving efficiency may be improved, and therefore a good user experience may be provided.

What is claimed is:

1. A computer system, comprising:
   a processor;
   a plurality of peripheral components; and
   a switch coupled to the processor via a first transmission interface link and respectively coupled to the peripheral components via a plurality of second transmission interface links, wherein the switch comprises a first flag register and a second flag register,
   when a first target peripheral component in the peripheral components is to be entered into a low power consumption mode, the processor sets a low power consumption flag bit corresponding to the first target peripheral component in the first flag register,
   when a second target peripheral component in the low power consumption mode in the peripheral components transmits a wake-up signal to the switch, the switch sets a wake-up flag bit corresponding to the second target peripheral component in the second flag register,
   wherein when the low power consumption flag bit corresponding to the first target peripheral component is set, a handshake operation is performed between the switch and the first target peripheral component, and the processor makes the second transmission interface link between the switch and the first target peripheral component enter a low power consumption state.

2. The computer system of claim 1, further comprising:
   a memory coupled to the processor and configured to store a basic input and output system program module,
   the processor loads the basic input and output system program module to perform a power management.

3. The computer system of claim 1, wherein the switch transmits a turn-off signal to the first target peripheral component and waits for the first target peripheral component to return an acknowledge signal.

4. The computer system of claim 1, wherein after the handshake operation is completed, the second transmission interface link between the switch and the first target peripheral component is switched to a ready state, and then the processor makes the second transmission interface link between the switch and the first target peripheral component enter the low power consumption state.

5. The computer system of claim 1, wherein after the second transmission interface link between the switch and the first target peripheral component enters the low power consumption state, the switch clears the low power consumption flag bit corresponding to the first target peripheral component.

6. The computer system of claim 1, wherein the switch further comprises:

a power enable controller configured to stop providing a power to the first target peripheral component after the second transmission interface link between the switch and the first target peripheral component enters the low power consumption state;

a reset controller configured to keep the first target peripheral component reset after the second transmission interface link between the switch and the first target peripheral component enters the low power consumption state; and a clock controller configured to stop providing a clock signal to the first target peripheral component after the second transmission interface link between the switch and the first target peripheral component enters the low power consumption state.

7. The computer system of claim 1, wherein when the second target peripheral component in the low power consumption mode in the peripheral components transmits the wake-up signal to the switch, the switch also transmits an input and output signal to the processor via a general-purpose input and output pin.

8. The computer system of claim 7, wherein when the processor receives the input and output signal, the second flag register is detected to learn about the second target peripheral component transmitting the wake-up signal, and then clears the wake-up flag bit corresponding to the second target peripheral component.

9. The computer system of claim 8, wherein the switch further comprises:

a power enable controller configured to resume providing a power to the second target peripheral component after the processor learns that the second target peripheral component transmitting the wake-up signal is received;

a reset controller configured to release a reset of the second target peripheral component after the processor learns that the second target peripheral component transmitting the wake-up signal is received; and a clock controller configured to resume providing a clock signal to the second target peripheral component after the processor learns that the second target peripheral component transmitting the wake-up signal is received.

10. A mode switching method, adapted for a computer system comprising a plurality of peripheral components and a switch, wherein the switch is respectively coupled to the peripheral components via a plurality of transmission interface links and comprises a first flag register and a second flag register, and the mode switching method comprises the following steps:

setting a low power consumption flag bit corresponding to a first target peripheral component in the peripheral components in the first flag register when the first target peripheral component is to be entered into a low power consumption mode;

setting a wake-up flag bit corresponding to a second target peripheral component in the peripheral components in the second flag register when the second target peripheral component in the low power consumption mode transmits a wake-up signal to the switch; and performing a handshake operation between the switch and the first target peripheral component and making the transmission interface link between the switch and the first target peripheral component enter a low power consumption state when the low power consumption flag bit corresponding to the first target peripheral component is set.

11. The mode switching method of claim 10, further comprising:

loading a basic input and output system program module to perform a power management.

12. The mode switching method of claim 10, wherein the step of performing the handshake operation between the switch and the first target peripheral component comprises:

transmitting a turn-off signal to the first target peripheral component via the switch, and waiting for the first target peripheral component to return an acknowledge signal.

13. The mode switching method of claim 10, wherein the step of making the transmission interface link between the switch and the first target peripheral component enter the low power consumption state further comprises:

switching the transmission interface link between the switch and the first target peripheral component to a ready state, and then making the transmission interface link between the switch and the first target peripheral component enter the low power consumption state after the handshake operation is completed.

14. The mode switching method of claim 10, further comprising, after the step of making the transmission interface link between the switch and the first target peripheral component enter the low power consumption state:

clearing the low power consumption flag bit corresponding to the first target peripheral component.

15. The mode switching method of claim 10, further comprising, after the step of making the transmission interface link between the switch and the first target peripheral component enter the low power consumption state:

stopping providing a power to the first target peripheral component;

keeping the first target peripheral component reset; and stopping providing a clock signal to the first target peripheral component.

16. The mode switching method of claim 10, further comprising:

transmitting an input and output signal via a general-purpose input and output pin when the second target peripheral component in the low power consumption mode in the peripheral components transmits the wake-up signal to the switch.

17. The mode switching method of claim 16, further comprising:

detecting the second flag register to learn about the second target peripheral component transmitting the wake-up signal when the input and output signal is received, and then clearing the wake-up flag bit corresponding to the second target peripheral component.

18. The mode switching method of claim 17, further comprising, after the step of learning about the second target peripheral component transmitting the wake-up signal:

resuming providing a power to the second target peripheral component;

releasing a reset of the second target peripheral component; and resuming providing a clock signal to the second target peripheral component.

* * * * *